United States Patent

[11] 3,618,625

| [72] | Inventor | William R. Walters<br>1300 Sunset, Pawhuska, Okla. 74056 |
|---|---|---|
| [21] | Appl. No. | 872,109 |
| [22] | Filed | Oct. 29, 1969 |
| [45] | Patented | Nov. 9, 1971 |

[54] ICE AXE VALVE
10 Claims, 4 Drawing Figs.

[52] U.S. Cl. .................................................. 137/62,
119/73, 137/389, 236/93
[51] Int. Cl. .................................................. A01k 7/02
[50] Field of Search .................................................. 137/59, 60,
62, 301, 468; 236/93, 93 A; 222/54

[56] References Cited
UNITED STATES PATENTS

| 1,268,648 | 6/1918 | Van Meter .................. | 137/62 |
| 1,554,344 | 9/1925 | Haapanen .................. | 137/62 |
| 1,558,276 | 10/1925 | Peterson .................. | 137/62 |
| 2,804,758 | 9/1957 | Smith .................. | 137/62 X |
| 3,384,109 | 5/1968 | Stroburg .................. | 137/59 X |

*Primary Examiner*—Alan Coham
*Assistant Examiner*—Richard Gerard
*Attorneys*—Clarence A. O'Brien and Harvey B. Jacobson

ABSTRACT: Water stored in a tank is prevented from freezing by opening of a valve device conducting a restricted outflow of water under control of a temperature-sensing element located adjacent the surface of the water where freezing begins. The outflow of water induces inflow of water at a higher temperature from a remote source to maintain the temperature level of the water within the tank above an adjusted value.

PATENTED NOV 9 1971
3,618,625
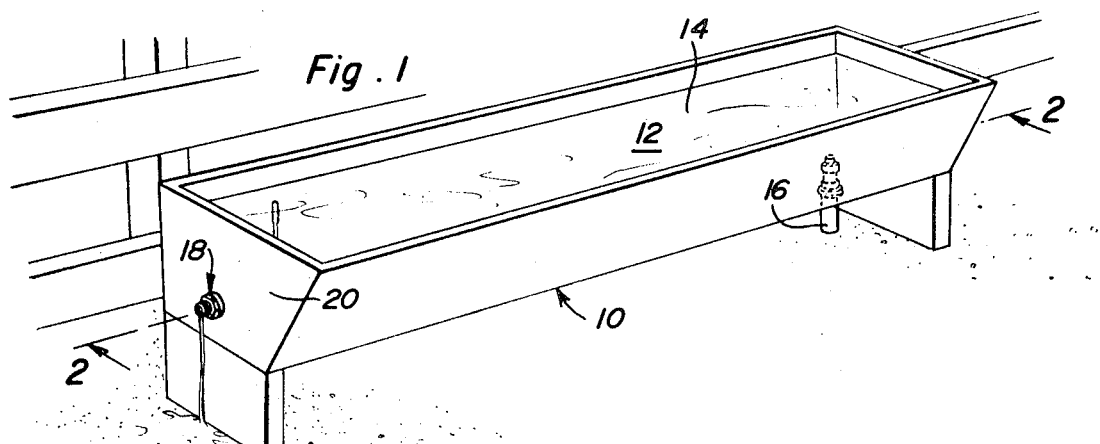
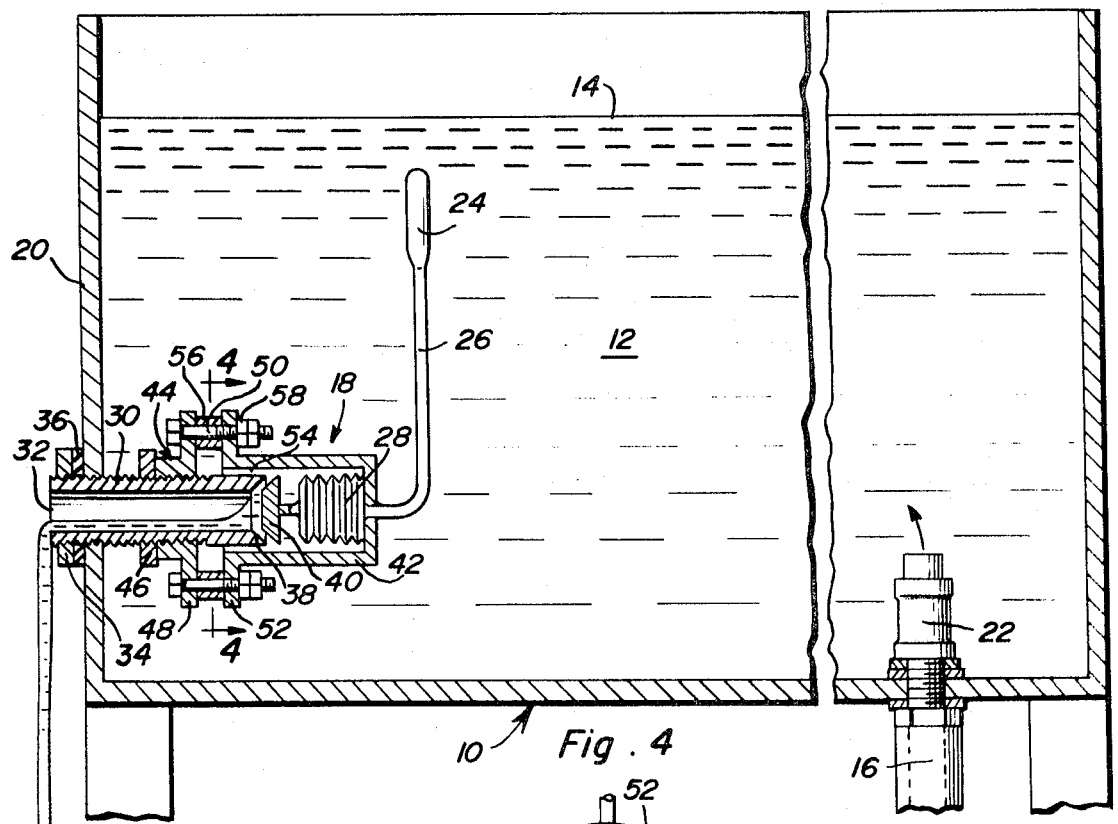
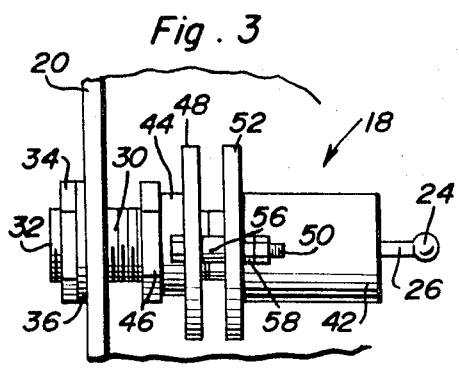
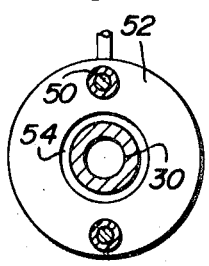
William R. Walters
INVENTOR.
BY *Clarence A. O'Brien*
and *Harvey B. Jacobson*
Attorneys

ICE AXE VALVE

This invention relates to means for preventing freezing of water within a tank and more particularly to an outflow-regulating valve device in combination with a water-storing tank connected to a source of water under pressure from which supply of water at a higher temperature is received to maintain the temperature level of the water in the tank above freezing.

Water must often be stored in open tanks under freezing weather conditions for watering of cattle or horses. However, there is a problem in preventing the water from freezing. While such open water tanks may be provided with heating elements and temperature-sensing controls to prevent water freezing, it will be appreciated that such facilities are relatively expensive both with respect to installation and maintenance and are sometimes not very reliable under extreme weather conditions. Accordingly, there is a need for a relatively simple, economical and reliable method and apparatus for preventing the freezing of water in open tanks.

In accordance with the present invention, freezing of water in a static condition within an open tank is prevented by conducting an inflow of water at a relatively higher temperature whenever the temperature level of the water stored in the tank approaches a freezing value particularly near the surface thereof. The open tank is accordingly connected to a source of water under pressure from which an inflow of water is induced by producing a regulated outflow of water from the tank whenever the temperature of the water near the surface level approaches a freezing value. The outflow-regulating valve is accordingly mounted on a wall of the tank substantially below the level of the water therein and includes a tubular outflow member having an inner valve seat end adapted to be engaged by a valve element normally biased to a closed position. The valve element is connected to a closed pressure-actuated bellows device for displacement to an open position in response to a drop in temperature, and thus internal pressure within the bellows device, of the water or liquid within the tank to a predetermined load temperature. As the discharge water from the tank through the outflow member lowers the liquid level within the tank, the static pressure acting upon the bellows device is lowered tending to close the valve element and the attendant liquid level-controlled liquid supply system for the tank admits water into the tank to replace the water discharged therefrom with the supply water entering the tank being at a higher temperature so as to increase the water temperature within the tank further actuating the bellows device to close the valve element. Water within the tank is circulated to "axe" or break up any film of ice produced at the surface of the water.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view showing a typical installation for the system of the present invention.

FIG. 2 is an enlarged partial sectional view taken substantially through a plane indicated by section line 2—2 in FIG. 1.

FIG. 3 is a top plan view showing the outflow-regulating valve device associated with the present invention.

FIG. 4 is a transverse sectional view taken substantially through a plane indicated by section line 4—4 in FIG. 2.

Referring now to the drawings in detail, FIG. 1 shows an open tank or container 10 which may be in the form of an animal watering trough for example. Thus, a body of water or liquid is stored under static conditions within the container with the top surface level 14 thereof exposed to ambient weather conditions. It will therefore be apparent, that under extremely low atmospheric temperature conditions, the body of water 12 is likely to freeze. For this reason, the container 10 is connected to a remote source of water under pressure by means of an inlet conduit 16. The water at the source and in the inlet conduit 16 will obviously be at a relatively higher temperature than the temperature of the body of water 12 when approaching freezing conditions. However, to prevent freezing of the water 12, a restricted outflow is conducted from the tank through an outflow-regulating valve generally referred to by reference numeral 18 mounted on the tank at any suitable location as for example on the end wall 20. As a result of any outflow of water from the valve device 18, an inflow of water from the inlet conduit 16 is induced to thereby prevent freezing of the body of water 12.

With reference to FIG. 2, it will be apparent that the water 12 stored within the tank 10 will be maintained at a predetermined static pressure level 14. Should the water level drop because of any outflow through the valve device 18, the water level will be restored by an inflow of water under pressure from the inlet conduit 16 through a pressure-controlled inlet valve fitting 22, for example. The valve device 18 is controlled by any suitable temperature-sensing device including, for example, a sensing bulb 24 connected to one end of a tubular conduit 26, the other end of which is connected to a pressure bellows component 28 enclosed within the valve device. The sensing bulb 24 is located adjacent the top surface 14 of the body of water 12 where an ice film begins to form under freezing conditions so as to control the opening of the valve device 18 before any substantial freezing of the water occurs.

As shown in FIGS. 2, 3 and 4, the valve device 18 includes an externally threaded outlet tube 30 having a discharge end 32 projecting from the tank. A mounting nut 34 is threadedly mounted on the external portion of the outlet tube in abutment with a lock washer 36 clamped against the wall 20 of the tank for mounting the outlet tube 30 on the tank in a fixed position.

The inner end of the outlet tube is provided with a valve seat surface 38 adapted to be engaged by a valve element 40 connected to the bellows component 28 of the temperature sensing device in axial alignment with the outlet tube. The valve element 40 is biased to an open position by the water pressure acting upon the bellows component, which water pressure decreases as the level drops to limit the amount of water discharged when the internal pressure of the bellows is reduced, by a reduction of ambient water temperature at the bulb 24, below its normal pressure holding the valve closed. The opening bias of the water pressure within the tank acts upon the bellows to thus open the valve in response to a reduction in internal pressure within the bellow element 28 when a predetermined low temperature is sensed by the bulb 24.

The valve element 40 and the bellows component 28 are enclosed within a tubular housing 42 which is supported in radially spaced and axially overlapping relation to the outlet tube 30 so as to also enclose the valve seat surface 38 and admit a restricted outflow of water when the valve element 40 is in its open position as illustrated in FIG. 2. The housing 42 is mounted on the outflow tube in a proper axially adjusted position by means of an internally threaded support member 44 threadedly mounted on the outlet tube and held in adjusted position by an adjustment nut 46. The support member 44 is provided with a flange portion 48 carrying fastener bolts 50 in radially spaced relation to the outlet tube 30. The bolts 50 extend through aligned openings in a flange portion 52 of the housing 42 which is thereby held in radially spaced relation to the outlet tube 30 so as to form a restricted annular passage 54 therebetween. Further, the housing is axially spaced from the support member 44 by tubular spacers 56 on the bolts 50. Assembly nuts 58 threadedly mounted on the bolts 50 in abutment with the flange portion 52 of the housing hold the housing supported in assembled relation on the support member 44 axially spaced therefrom by the spacers 56. Thus, the valve device may be economically manufactured, assembled and installed for reliable operation with a minimum amount of maintenance.

The temperature at which the sensing bulb 24 is operative to open the valve element 40 may be varied by axially adjusting the position of the housing 42 and support member 48 on the externally threaded tube 30. Toward this end, the lock nut 46 is backed away from member 44 which is then rotated in either direction to either compress the bellows 28 or permit it to expand while the valve element 40 is seated. In this manner the internal pressure in the bellows may be increased to thereby require a colder temperature before the valve element 40 is opened or the internal pressure is reduced to thereby raise the temperature at which the valve element opens. Thus, the temperature limit maintained by the valve device may be readily adjusted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. In combination with a container-storing liquid at a static level supplied from a remote source at a predetermined pressure, means for limiting the temperature of the liquid within said container comprising outflow-regulating means mounted by the container for inducing inflow of liquid at a rate equivalent to the outflow rate and at a relatively high temperature from the source in response to outflow of liquid from the container, and temperature-sensing means connected to the outflow-regulating means for producing said outflow therethrough in response to a relatively lower temperature in an upper strata of the liquid adjacent said static level thereof.

2. The combination of claim 1 wherein the outflow-regulating means comprises a valve device fixedly mounted by the container submerged within the liquid substantially below said static level, fluid pressure means normally biasing said valve device to a closed position, said valve device being opened by the pressure of the liquid to discharge a limited flow of the liquid to atmosphere.

3. The combination of claim 1 including inlet means connecting the source to the container for inflow of liquid in response to a drop in level of the liquid below said static level.

4. The combination of claim 3 wherein the outflow-regulating means comprises a valve device fixedly mounted by the container submerged within the liquid substantially below said static level, fluid pressure means normally biasing said valve device to a closed position, said valve device being opened by the pressure of the liquid to discharge a limited flow of the liquid to atmosphere.

5. In combination with a container-storing liquid at a static level supplied from a remote source at a predetermined pressure, means for limiting the temperature of the liquid within said container comprising flow-regulating means mounted by the container for inducing inflow of liquid at a relatively higher temperature from the source in response to outflow of liquid from the container and temperature-sensing means connected to the flow-regulating means for producing said outflow therethrough in response to a relatively lower temperature of the liquid adjacent said static level thereof, said flow-regulating means comprising a valve device fixedly mounted by the container submerged within the liquid substantially below said static level, fluid pressure means normally biasing said valve device to a closed position, said valve device being opened by the pressure of the liquid to discharge a limited flow of the liquid to atmosphere, said valve device including an externally threaded outlet tube having a valve seat at one axial end, a support member threadedly mounted on the tube in adjustably spaced relation to the valve seat; a tubular housing, a valve element connected to the temperature sensing means within the housing in axial alignment with the valve seat end of the tube, and spacer means connecting the housing to the support member in radially spaced and axially overlapping relation to the valve seat end of the tube.

6. The combination of claim 5 wherein said temperature-sensing means includes a bellows element enclosed within the housing, a tubular conduit connected to the bellows element externally of the housing and a sensing bulb connected to an end of the tubular conduit vertically spaced above the housing.

7. The combination of claim 6 including inlet means connecting the source to the container for inflow of liquid in response to a drop in level of the liquid below said static level.

8. In combination with a container-storing liquid at a static level supplied from a remote source at a predetermined pressure, means for limiting the temperature of the liquid within said container comprising flow-regulating means mounted by the container for inducing inflow of liquid at a relatively higher temperature from the source in response to outflow of liquid from the container, and temperature-sensing means connected to the flow-regulating means for producing said outflow therethrough in response to a relatively lower temperature of the liquid adjacent said static level thereof, said flow-regulating means including an externally threaded outlet tube having a valve seat at one axial end, a support member threadedly mounted on the tube in adjustably spaced relation to the valve seat, a tubular housing, a valve element connected to the temperature-sensing means within the housing in axial alignment with the valve seat end of the tube, and spacer means connecting the housing to the support member in radially spaced and axially overlapping relation to the valve seat end of the tube.

9. The combination of claim 8 wherein said temperature-sensing means includes a bellows element enclosed within the housing, a tubular conduit connected to the bellows element externally of the housing and a sensing bulb connected to an end of the tubular conduit vertically spaced above the housing.

10. In combination with a container-storing liquid under static conditions and a source of said liquid under pressure at a predetermined temperature, means for limiting the temperature of the liquid in the container comprising outflow-regulating means mounted by the container for conducting a restricted outflow of liquid from the container, temperature-sensing means connected to the outflow-regulating means for opening thereof in response to an excessive decrease in temperature in an upper strata of the liquid in the container, means responsive to said outflow of liquid from the container for conducting an inflow of the liquid from the source at a rate equivalent to the outflow rate and means for varying the temperature at which the flow-regulating means opens.

* * * * *